United States Patent

[11] 3,614,402

[72] Inventor Leonard James Higgins
Watervliet, N.Y.
[21] Appl. No. 878,612
[22] Filed Nov. 21, 1969
[45] Patented Oct. 19, 1971
[73] Assignee Datacq Systems Corporation
Latham, N.Y.

[54] SIGNAL-GENERATING APPARATUS USING FIBER-OPTIC SENSORS HAVING MULTIPLE LIGHT INPUTS AND A SINGLE COMMON ELECTRO-OPTICAL OUTPUT CONVERTER
8 Claims, 9 Drawing Figs.

[52] U.S. Cl. .................................................... 235/154,
250/219 R, 250/227, 340/347 DD, 340/365, 340/380
[51] Int. Cl. .................................................... G02b 5/16,
G06f 5/02, G08c 9/00
[50] Field of Search .................................................... 235/154,
61.11, 61.115, 61; 340/347 AD, 347 DD, 365, 380; 250/219 IO, 227; 178/6, DIG. 2; 197/20

[56] References Cited

UNITED STATES PATENTS

| | | | |
|---|---|---|---|
| 2,641,753 | 6/1953 | Oliwa | 340/365 X |
| 3,104,388 | 9/1963 | Balenger | 340/365 X |
| 3,430,226 | 2/1969 | Chow et al. | 340/365 X |
| 3,465,099 | 9/1969 | Harris | 340/365 X |
| 3,465,130 | 9/1969 | Beltz et al. | 235/61.115 |
| 3,491,337 | 1/1970 | Guzak et al. | 340/365 X |
| 3,495,239 | 2/1970 | Glorioso et al. | 340/365 X |
| 3,509,563 | 4/1970 | Boggs | 340/365 X |

OTHER REFERENCES

IBM Technical Disclosure Bulletin, Thorpe, " Optical Scanner," Vol. 4, No. 7, Dec. 1961, pp. 20 & 21

*Primary Examiner*—Maynard R. Wilbur
*Assistant Examiner*—Thomas J. Sloyan
*Attorneys*—Joseph V. Claeys and Charles W. Helzer

ABSTRACT: A multiposition encoder for keyboard-actuated devices such as desk calculators and the like is provided and comprises a plurality of individually coded target members with each coded target member being representative of a particular alphanumeric character and being connected to a respective key of the keyboard-actuated device that corresponds to the character represented by the coded target member. A plurality of interrogating sensing and readout detectors in the form of light-transmitting and light-receiving fiber-optic elements are positioned adjacent respective ones of the individual coded target members for sensing and reading out the respective coded characters. Means are provided for selectively individually translating the coded target members past their respective sensing and readout detectors upon actuation of the keys with which they correspond. A common electrooptical converting means is coupled to and supplied from all of the light-receiving and fiber-optic sensors for converting the outputs from the sensing and readout detectors into serial, coded pulsed electric signals representative of the intelligence contained in the selectively actuated keys and their associated coded target members. The encoder may comprise either a separate attachment to an existing equipment such as a desk calculator, or may be fabricated into and comprise an integral part of such equipment. In a preferred arrangement, the light-transmitting fiber-optic elements of all of the respective sensing and readout detectors are supplied from a single common light source and all of the light-receiving fiber optical elements of the detectors are coupled to a single, common output electrooptic converter such as a photocell, a phototransistor, or the like. The multiposition signal-generating encoder also may be applied to a number of different machine tool control, testing sequence and other similar applications.

INVENTOR
LEONARD J. HIGGINS

Charles W. Helzer
ATTORNEY

PATENTED OCT 19 1971 3,614,402

SHEET 2 OF 3

SIGNAL-GENERATING APPARATUS USING FIBER-OPTIC SENSORS HAVING MULTIPLE LIGHT INPUTS AND A SINGLE COMMON ELECTRO-OPTICAL OUTPUT CONVERTER

BACKGROUND OF INVENTION

1. Field of Invention

This invention relates to a multiposition electric signal encoder for devices such as desk calculators and the like.

More particularly, the invention relates to a new and improved desk calculator having a relatively low-cost, reliable, electric signal encoder incorporated therein for producing hard copy, permanent records of calculations performed on the desk calculator, and simultaneously producing coded, pulsed electric output signals representative of alphanumeric numbers and instruction characters punched into the calculator during an operation cycle. This coded, pulsed electric output signal may be supplied to a central data processing computer for central record keeping purposes.

2. Prior Art Problem

Desk calculators of either the mechanical or electrically operated variety are at this time established equipment for all stores, catalogue order placement facilities, warehouses, etc., and are used extensively in conducting the business of these establishments. These familiar devices are in such widespread use that like the typewriter and telephone, they have become a way of life in conducting the day-to-day business of the nation. The role of the desk calculator in providing current, hard copy, permanent records of the transactions of the offices in which they are used, is well recognized. What has not been widely recognized to date, however, is that every desk calculator is use constitutes an original data source for the business in which it is used. In multioffice businesses, the problem of supplying the data from all of these multioffice original data sources into a central record keeping facility, has been a continuing management problem. The advent of the central data processing computer has eased this burden greatly. Nevertheless, the problem of converting normal, printed, office records to machine readable form through punched cards, magnetic tape etc., is time-consuming, costly and subject to error. To overcome this problem, the present invention was devised.

In addition to the above-mentioned rather substantial need, a general need exists for a reliable, low-cost multiposition signal-generating encoder for observing and recording through the derivation of uniquely coded output electrical signals the fact of occurrence of each one of the sequence of events such as a series of control actions, as well as the order of occurrence of the events, should such information be desired. Applications for such an encoder exist in connection with testing procedures such as occur during the countdown phase of a missile launching, or providing positive interlock control over the operation of an automatically controlled process, machine, plant or other equipment.

SUMMARY OF INVENTION

It is, therefore, a primary object of the present invention to provide a multiposition electric signal encoder for devices such as desk calculators and the like for simultaneously producing an output-coded electric signal representative of the data being generated by the device. The electric encoder may be added to existing keyboard-actuated devices as a separate attachment, or it may be built into such devices at the time of original manufacture thereof as an integral part of the equipment.

Another object of the invention is to provide a new and improved desk calculator having a relatively low-cost, reliable, electric signal encoder incorporated therein for producing not only hard copy, permanent records of calculations performed on the desk calculator, but also simultaneously producing coded, pulsed, electric output signals representative of the alphanumeric numbers and instruction characters punched into the calculator for transmission to a central data processing computer for central record keeping purposes. Such transmission to the central data processing computer may take place concurrently with the generation of the data in question, or alternatively may be recorded on magnetic tape for transmission at a later, more convenient time that is suitable for the central data processing computer.

A still further object of the invention is to provide a multiposition signal-generating encoder which is reliable in operation, low in cost and derives a uniquely coded output signal indicative of the fact of occurrence of each unique event in a sequence of such events (such as a series of control actions in a machine) and also indicative of the order of occurrence of the events. Because of its design, the uniquely coded output signals may be readily changed to identify different specific events and/or their order of occurrence in order to accommodate the requirements of a particular application.

In practicing the invention, a multiposition encoder for devices such as desk calculators and the like is provided. The encoder comprises a plurality of individually coded target members with each coded target member being representative of a particular alphanumeric character associated with a particular key of the keyboard-actuated device. A plurality of interrogating sensing and readout detectors in the form of light-transmitting and light-receiving fiber-optic elements are positioned adjacent each respective one of the individually coded target members for sensing and reading out the respective coded characters. Means are provided for selectively individually translating the coded target members past their respective sensing and readout detecting element simultaneously with the actuation of the key of the keyboard device with which they are associated. Common electro-optical converting means in the form of a photo cell, phototransistor, or the like, is light-coupled to the fiber-optic light-receiving elements of all of the sensing and readout detectors for converting the outputs from the sensing and readout detectors into serial, coded, pulsed electric signals representative of the intelligence contained in the selectively actuated keys of the keyboard device. The uniquely coded electric signals thus derived may be supplied directly to a central data processing computer at the time of generation through the use of a telephone coupling link, or other similar arrangement, or they may be recorded on a suitable medium such as magnetic tapes, etc. for storage and subsequent transmission to the central data processing computer at a more convenient time for the computer. In addition to a single, common electro-optical converting means, the encoder arrangement also preferably includes a single, common light source supplying all of the light-transmitting fiber-optic elements of all of the sensing and readout detectors of the encoder.

Each of the target members preferably comprises an array of alternate different light-reflecting and nonreflecting stripes arrayed in a characteristic coded sequence representative of a particular alphanumeric character, a particular control action, event or the like.

The multiposition electric signal encoder may be provided as a separate attachment to existing office equipment of the desk calculator type or it may be built into such equipment at the time of original manufacture thereof as an integral part of the equipment. In either event, a keyboard-actuated device of the desk calculator type is produced which will include register and calculating means for registering selected ones of the alphanumeric characters as determined by the settings of the keys of the device and performing desired arithmetic operations with respect to the selected ones of the alphanumeric characters. The keyboard-actuated device will also normally include printing means connected to and actuated by the keys of the device as well as register and calculating means for providing a solution in the form of a sum, difference, etc. together with an instantaneous, permanent, hard copy record of the transaction recorded with the keyboard-actuated device. The encoder is included in such a structure either as a separate attachment or as an integral part and operates in the above-described fashion to simultaneously develop pulsed, coded electric output signals representative of the particular alphanumeric characters actuated in any given transaction recorded with the device as well as the order in which the characters were selected.

While a preferred embodiment of the invention utilizes the multiposition encoder in conjunction with a keyboard-actuated device of the desk calculator type, the invention is in no way restricted to use in this manner. The multiposition encoder may be employed in a large number of applications wherein it is desired to uniquely identify and verify the fact of occurrence of each event in a sequence of events as well as the order of occurrence (should such be desired). For example, in the automatic control of machines, material processing equipment and plants, etc., it is necessary to properly sequence each controlled action or event prior to a succeeding action or event being initiated. Similarly, a number of testing procedures such as occur during the countdown phase of a missile launching, it is essential to determine that a controlled action or event has taken place, to verify the fact of occurrence and establish its order of occurrence. The multiposition electric signal encoder made available by the invention may be used in any of these applications by appropriate design and arrangement of the encoder targets. Further, merely by rearranging the encoder targets in a different characteristic manner, the order of occurrence of the controlled events or actions readily may be changed.

BRIEF DESCRIPTION OF DRAWINGS

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein.

DETAILED DESCRIPTION OF PREFERRED EMBODIMENTS

Figure 1:
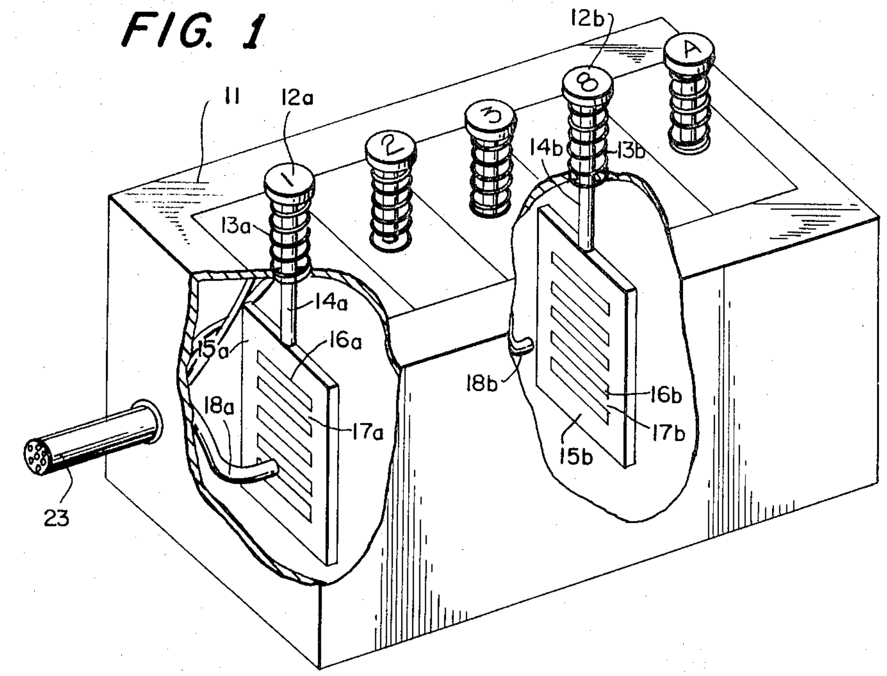
FIG. 1 is a partially broken away perspective view of a low-cost version of a multiposition electric signal encoder for keyboard-actuated and similar devices constructed in accordance with the invention.

FIG. 1 is a partially broken away perspective view of a low-cost multiposition keyboard encoder device constructed in accordance with the invention. This low-cost keyboard encoder may be employed as an auxiliary instruction signal generator or some similar function where it is desirable to develop pulsed electric output signals for supply to a central data processing computer, magnetic instruction tape or the like to augment the instructions and data supplied from other existing office equipment as will be described hereinafter.

The auxiliary instruction signal generator shown in FIG. 1 is comprised generally by a housing 11 supporting a plurality of key-actuated plunger devices 12 each of which is identified with a particular or characteristic marking such as the number 1, 2, 4, 8, A. These keys are reciprocally supported in suitable bearing surfaces on the housing 11 so as to be vertically translatable down and up against the action of an associated return coil spring 13 acting between the tops or caps of the keys 12 and the housing 11. By this arrangement, depression of any one of the keys 12 will cause the key to move downwardly against the action of the return coil spring 13 and thereafter to be moved upwardly or in a return direction by reason of the coil spring.

Figure 3:
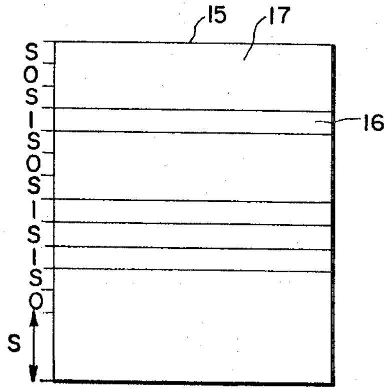
FIG. 3 is a schematic plan view of the layout of a target member or target flag area illustrating the manner in which coding of the target members associated with each key of a keyboard-actuated device or similar control apparatus, is accomplished.

Each of the keys 12 has a vertically extending rod or shaft 14 to which is attached a target flag 15 which is allowed to move up and down in the above-described manner upon depression of a respective key 12. The target member 15 has formed thereon a coded array of alternate light-reflecting stripes such as shown at 16 and nonreflecting surfaces such as shown at 17 which are arrayed in a predetermined characteristic coded pattern. FIG. 3 of the drawings illustrates a typical layout for the coded array of alternate light-reflecting and nonreflecting strips 16 and 17 on the target member 15 as envisioned by the invention. The particular layout shown in FIG. 3 anticipates the provision of a space intermediate each intelligence bearing stripe or surface 16 and 17 so as to facilitate easy and reliable readout of the coded information contained thereon as described hereinafter. It should be noted, however, that this particular layout is cited as exemplary only to illustrate a typical example of target member fabrication having a certain dimensional mark-space ratio to provide a desired output binary code sequence (such as a six-bit binary code), allowable within the constraints dictated by the dimensional tolerances of the housing 11.

The provision of the separating spaces marked with a small *s* in the left-hand margin intermediate each intelligence-bearing area or stripe marked with a "0" or a "1" facilitates readout of the member. If the dimensional tolerances of the housing did not allow it, the separating spaces *s* could be eliminated so that adjacent stripes are intelligence bearing. The presence of a light-reflecting surface can be chosen to indicate either a binary "1" or a binary "0," and the absence of a nonreflecting surface can be chosen to represent the converse. Thus, if the target surface shown in FIG. 3 is scanned or otherwise read out in the downward direction, a resultant coded electric output signal can be developed, as will be described hereinafter, which would form 010110. More elaborate and sophisticated code sequences are, of course, possible and can be provided readily in substantially the same manner if required for a particular application. In one embodiment of the invention, an overall target flag three-sixteenths inch with the three-sevenths inch dimension being divided into 15 regions to form an eight-bit code. With this format, about three one-hundred twentieths or one-fortieth inch would be required to form a nonreflecting dividing space *s*, a binary "0" or a reflecting binary "1" space or stripe, as the case may be, with all of the reflecting and nonreflecting stripes or areas being equal in dimension. Obviously, it is possible to vary this specific format in order to obtain a greater encoding capability, etc., as a particular application may require.

The array of coded alternate nonreflecting and reflecting stripes 16 and 17 may be designed to provide any information content desired. These stripes can be chosen to conform to a particular code sequence such as binary decimal code sequence 1, 2, 4, 8, and any additional desired alphanumeric character such as the letter "A" to provide for a particular application need. With this arrangement, binary-coded decimal signals representative of numbers 1–10 can be generated in a well-known manner. By assigning an appropriate decimal number for a given instruction such as "start new column," "list," "start new paragraph," "end of paragraph," "add," "-subtract," "multiply," "divide," "differentiate," etc. instructions can be supplied to a central data processing computer for use in conjunction with the data bearing signals developed by other existing office equipment as will be described hereinafter.

In order to derive electric output signals from the coded array of alternate light-reflecting and nonreflecting surfaces on the target members 15, a sensing and readout-detecting element is disposed adjacent each respective target member 15*a*, 15*b* and the like. These sensing and readout-detecting elements indicated at 18*a* and 18*b* preferably comprise fiber-optic bundles of interrogating light-transmitting fiber-optic elements appropriately intertwined with fiber-optic bundles of light-receiving fiber-optic elements. By this arrangement, it will be seen that upon depression of any one of the keys 12*a*, 12*b*, etc. selectively in accordance with a desired instruction to be transmitted, the respective, associated target member 15*a*, 15*b*, etc. will be translated downwardly in a direct or forward direction past the sensing and readout element associated with that particular target member such as 18*a*, 18*b*, etc. Following this direct or forward movement downward the return spring 13*a* will return the key and associated target member to its normal or quiescent raised position so as to again translate the coded array of alternate reflecting and nonreflecting stripes past the detecting and readout elements in the return movement.

During movement in either direction, light supplied through the interrogating light-transmitting fiber-optic elements will impinge upon the alternate light-reflecting and non or minimally reflecting surfaces and either will be reflected back to the light-receiving fiber-optic elements with considerably intensity or not, depending on the nature of the stripe instantaneously disposed opposite the detecting and readout elements. In this manner, varying intensity light pulses will be produced in the light-receiving fiber-optic elements which are representative of the particular coded array of alternate light-reflecting and nonreflecting stripes of the coded target members 15. It should be noted that while the target members 15 have been described as comprising coded arrays of alternate light-reflecting and nonreflecting or minimally reflecting surfaces, it is quite possible to fabricate the targets of different light-modifying mediums. For example alternate stripes of light-transmitting openings and light opaque surfaces could be employed. Such an arrangement, however, would require that the light-receiving fiber-optic elements be disposed on opposite sides of the target members from the light-transmitting fiber-optic elements, This requirement would extend to complicate construction of the signal encoder and hence the arrangement of alternate light-reflecting and non or minimally reflecting surfaces is preferred.

Figure 2:
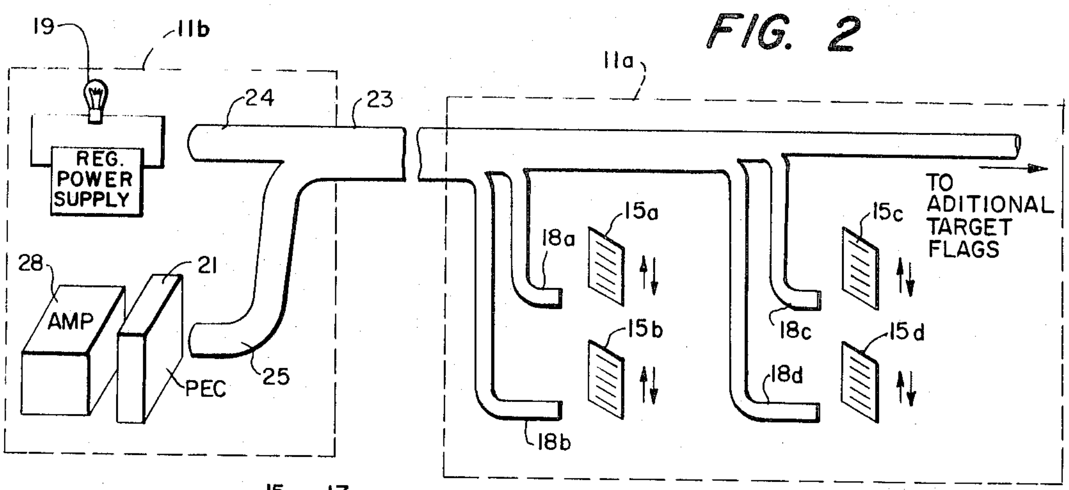
FIG. 2 is a functional, schematic diagram illustrating the light optic arrangement of a preferred form of the multiposition electric signal encoder and portrays the manner in which input information in the form of coded light pulses is collected from a multiplicity of points while supplying the accumulated input information through a single, output electro-optical converting arrangement.

FIG. 2 of the drawings is a schematic diagram of the light optic portion of the signal encoder, and illustrates the preferred relative arrangement of light-transmitting and light-receiving fiber-optic elements with respect to movable target members 15 and a single common source of illumination, shown at 19, for all of the light-transmitting fiber-optic elements, and a single electro-optical conversion device shown at 21 for all of the light-receiving fiber-optic elements. The electro-optical converting device 21 may comprise a conventional photo electric cell, a phototransistor, a photo diode or any other suitable photosensitive electro-optical device for converting the coded, pulsed light energy into coded, pulsed, electric signals. The electric signals derived by the photoelectric cell 21 may be amplified in an amplifying circuit shown at 22 and supplied directly through a suitable coupling connection, such as a telephone coupler, to a central data processing computer. Alternatively, the coded, electric output signals may be applied to a recorder for recording on a magnetic tape or other suitable recording medium for supply to the central data processing computer at a different, more convenient, time for the computer.

Figure 9:
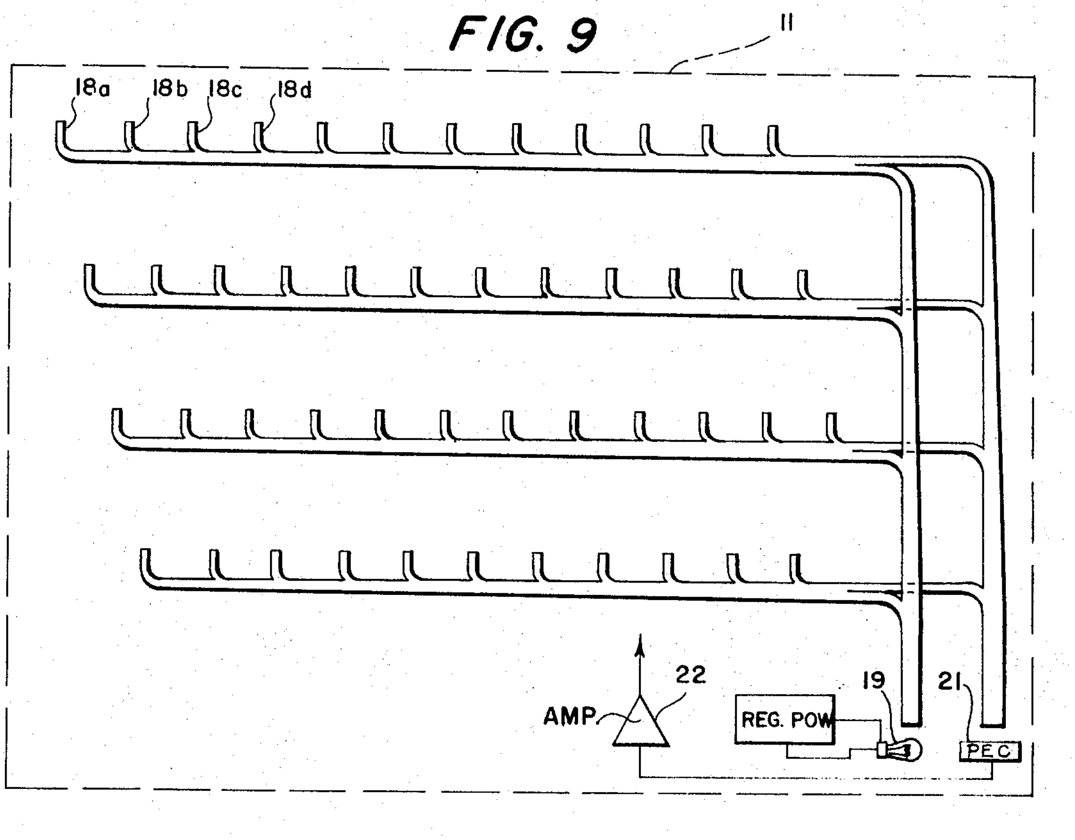
FIG. 9 is a schematic layout of an array of fiber-optic elements illustrating the manner in which they can be arrayed to read out different, uniquely positioned, coded target members from a multiplicity of control points for use in controlling the operation of an automatically controlled process or machine.

The photoelectric cell converter 21 and common source of illumination 19 may be contained in a separate housing portion 11*b* from the housing portion 11*a* containing the several sensing and detecting elements 18*a*, 18*b*, etc. or alternatively all parts of the encoder may be included in a single housing as shown in FIG. 9. Where two separate housing portions are employed, coupling between the two portions is achieved through an enlarged fiber-optic bundle 23 which has all of the fiber-optic light-transmitting and light-receiving elements for each of the sensing and detecting heads 18*a*–18*d*, etc. Intertwining of the respective light-transmitting and light-receiving elements facilitates manufacture of the encoder assembly. Within the housing portion 11*b*, all of the light-transmitting fiber-optic elements are separated out into a light-transmitting fiber-optic elements exposed to the single source of illumination 19. It is anticipated that the light source 19 would be regulated, or otherwise adjusted, to provide a constant source of light intensity to avoid signal degradation. The fiber-optic light-receiving elements similarly are all separated out from the common bundle 23 to form the light-receiving fiber-optic bundle 25 having the ends of the light-receiving fiber-optic elements disposed opposite the photosensitive surface of the photoelectric cell 21. By this arrangement, only a single photoelectric sensitive, electro-optical converting device is required for all of the multiplicity of sensing and readout detecting heads 18*a*–18*d*, etc. For a more detailed description of a suitable construction for the common fiber-optic bundle 23 and the manner in which the separate light-receiving elements of each of the detecting heads 18*a*–18*d*, etc. can be combined to form such a bundle and thereafter separated off to form the separate fiber-optic light-transmitting bundle 24 and light-receiving bundle 25, reference is made to U.S. Pat. No. 3,327,584, issued June 27, 1967, entitled "Fiber Optic Proximity Probe"—inventor—C. C. Kissinger—and assigned to Mechanical Technology, Inc.

In operation, the multiposition signal encoder shown in FIGS. 1–3 functions in the following manner. Upon any one of the keys 12*a*, 12*b*, etc. being depressed, its associated target member 15*a*, 15*b*, etc. will be translated by the end of the respective, interrogating, sensing and readout detecting elements 18*a*, 18*d*, etc. associated with the respective target members. This translational movement past the ends of the detecting elements causes the coded array of alternate light-reflecting and nonreflecting stripes to be scanned past the end of the light-transmitting and light-receiving fiber-optic elements comprising each of the detecting heads 18*a*, 18*b*, etc. The interrogating light beam transmitted from the common source of illumination 19 produces a steady-state or regulated level of light intensity through the several light-transmitting fiber-optic elements, and causes this interrogating light beam to be focused substantially on the center of the coded, alternate light-reflecting and nonreflecting stripes. Light reflected from the light-reflecting stripe will then be picked up by the light-receiving fiber-optic element of the detecting head and supplied back through the light-receiving bundle 25 to the photosensitive surface of the photoelectric cell converter 21. It will be appreciated that the received light transmitted to the photoelectric cell 21 will be in the form of pulses of light of greater intensity due to the alternate light-reflecting and nonreflecting character of the coded array of strips being scanned. The pulses of light thus transmitted to the photoelectric converter 21 will result in producing pulses of electric current in the output of photo cell 21 which is amplified by amplifier 22 and supplied through a suitable coupling link to a central data processing computer, a magnetic recorder, etc. In this manner, the intelligence contained in the coded array of intermixed reflecting and nonreflecting stripes 16 and 17 on the target members 15 will be converted into coded electric pulsed output signals representative of the data encoded on the movable members 15. The information thus provided may then be employed in any desired, predetermined manner to supply input data or instructions to the central data processing computer, magnetic recorder or the like.

It will be appreciated that several multiposition signal encoders of the type shown in FIG. 1 can be positioned at several different remote locations which comprise checkpoints for an overall system undergoing a test procedure such as occurs during the countdown phase of a missile launching. Each of the encoders is capable of generating several distinctive light pulse signals each of which may be assigned to identify a particular checkout step in the testing procedure. Obviously, if there is only one such step to be performed at a given checkout point, then the signal encoder for that point would require only one target flag and associated translating mechanism and detecting elements, or as many such target flags as there are discrete checkout steps. The light pulse signals from the several checkout points may then be supplied to a single electro-optical converter where they are converted to a serially coded pulsed electric signal for supply to a central control computer. Thus, it will be appreciated that the multiposition signal-generating encoder provides a reliable, low-cost means for deriving a uniquely coded output signal indicative of the fact of occurrence of each unique event in a sequence of such events and also indicative of the order of occurrence of the events. By making appropriate changes in the target flags and/or their actuation, the generation of the uniquely coded signals and the order of their occurrence readily may be changed to accommodate any given application. For example, by appropriate design and location, individual signal-generating elements (i.e., targets flag and detecting elements) may be located at strategic positions on an automatic tool control mechanism to assure proper cycling of the several phases of operation of the mechanism. Other similar examples for application of the encoder will be suggested to those skilled in the art.

Figure 4:
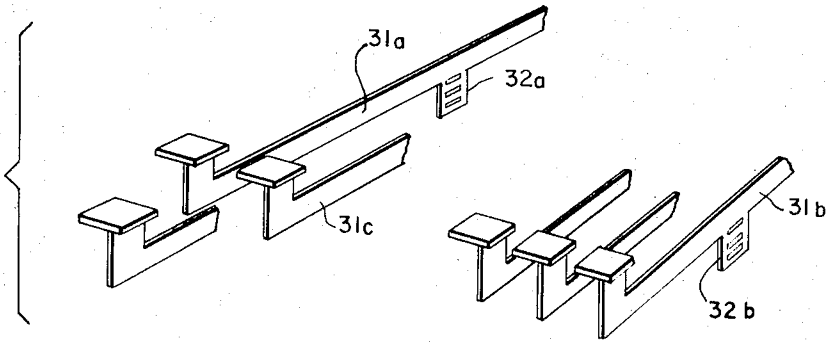
FIG. 4 is a schematic perspective view of a portion of a different form of low-cost, keyboard-actuated device having an electric signal encoder built thereon in accordance with the invention.
Figure 5:
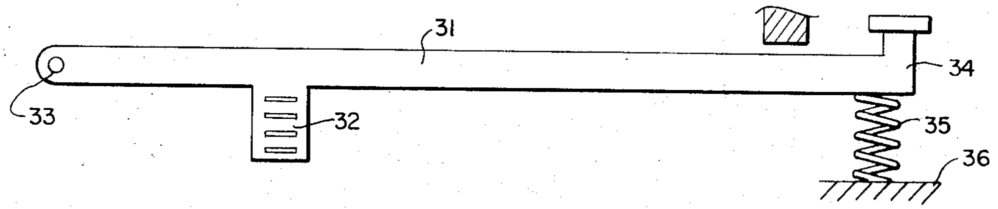
FIG. 5 is a side view of one of the key-actuated members of the partially illustrated keyboard device shown in FIG. 4.

FIGS. 4 & 5 of the drawings illustrate an alternative construction for a low-cost signal encoder constructed in accordance with the invention. In the embodiment of the invention shown in FIGS. 4 & 5, a plurality of key-actuated, pivoted lever arms are shown at 31 which have an integral target member shown at 32 formed thereon. The target members 32 preferably are formed on the undersurface of the pivoted lever arms 31 at some location intermediate the pivot point 33 and the free, key-actuated end of the lever arm 34. A compression spring 35 is interposed between the key-actuated, movable free end 34 of lever arm 31 and a surface 36 of a housing employed to enclose the keyboard device. The target members 32*a*, 32*b*, etc. of the respective key-actuated lever arms 31 are designated to be disposed opposite respective light-interrogating and readout-detecting fiber-optic sensors such as those shown at 18*a*, 18*b*, etc. in FIG. 2 of the drawings. The respective target members 32*a*, 32*b*, etc. are fabricated in a manner similar to the target members described with relation to FIGS. 1- 3 and the fiber-optic sensing and detecting elements are connected in a light optic, electro-optic converter system similar to that shown in FIG. 2 of the drawings. Accordingly, the embodiment of the invention shown in FIGS. 4 & 5 will function in essentially the same manner as the encoder described with relation to FIGS. 1—3.

Figure 6:
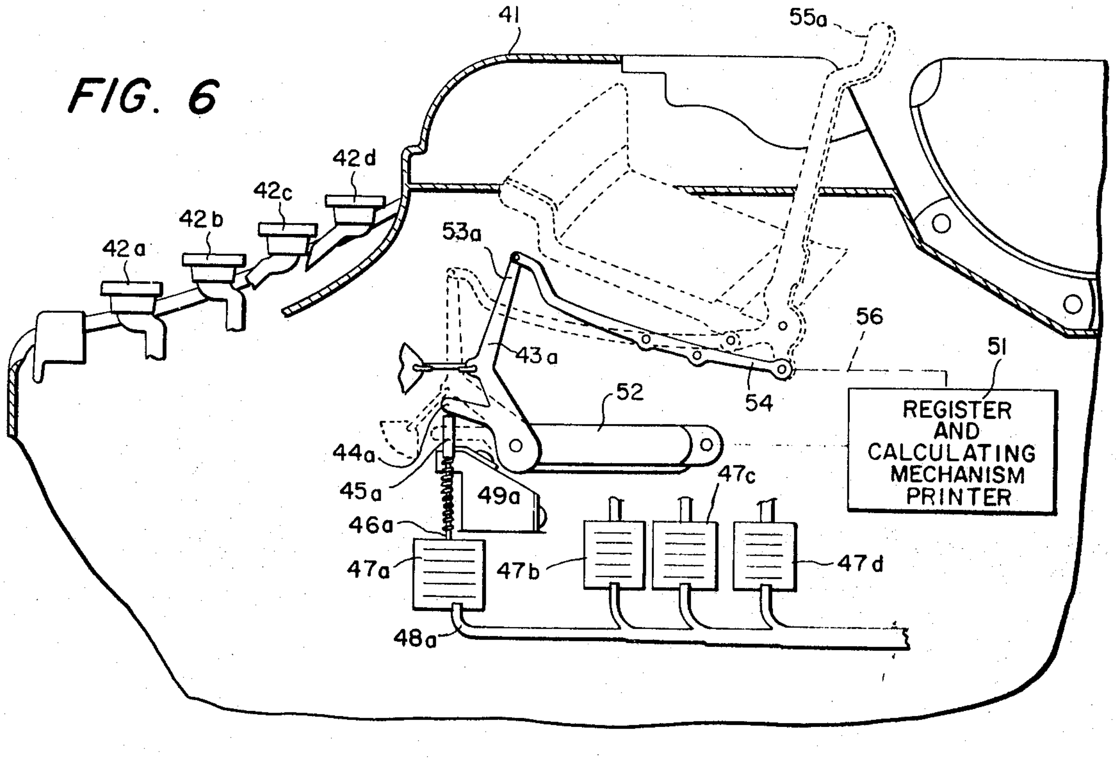
FIG. 6 is a broken away, partial side view of a desk calculator incorporating as a part thereof a multikey electric signal encoding arrangement constructed in accordance with the invention.

FIG. 6 of the drawings is a partially broken away, side sectional view of a conventional desk calculator formed by a housing 41 supporting a plurality of keys 42 that form a keyboard for the desk calculator. Each of the keys 42 may be selectively translated downwardly upon being punched or depressed and serves to transmit through a suitable intercoupling linkage (not shown) relative motion to an associated, respective bellcrank lever arm such as shown at 43*a*. The bellcrank lever arm 43*a* includes a first lever arm 44*a* adapted to engage the end of a spring-biased plunger 45*a* connected through a reciprocally movable rod 46*a* to a respective target member 47*a*. A coil compression spring normally biases the plunger 45*a* into its upward position with the key 42*a* (and hence bellcrank 43*a* with which it is associated) in its normal, quiescent undepressed condition.

Upon any one of the keys 42*a*–42*d*, etc. being selectively depressed, motion will be transmitted through the interconnecting linkage to its respective bellcrank 43*a*, etc. causing it to be pulled or rotated forwardly from its solid line position to the dotted line position. This results in rotating the lever arm 44*a* downwardly against the plunger 45*a* so as to cause the target member 47*a* to be translated or scanned past the end of an associated, fiber-optic, light-transmitting and light-receiving, interrogating and readout-detecting head 48*a* which is physically disposed immediately adjacent the respective target member 47*a*. Thereafter, upon release of the selected key 42*a*, the bellcrank 43*a* will be returned to its normal solid line position and the target 47*a* will be returned to its normal raised position by the compression spring 49*a*. During the translational downward scanning movement, as well as during the return upward scanning movement, the fiber-optic interrogating and readout-detecting element will function to derive coded, pulsed electric output signals (in conjunction with a photo electric cell converter not shown) which are representative of the character of the selectively depressed key 42*a*. The signal derived during the downward scanning movement of target member 47 may then be compared to the signal derived during the return upward scanning movement of the target member (through appropriate programming of the central data processing computer) for parity check purposes. It will be appreciated, therefore, that insofar as the signal encoding aspects of the embodiment of the invention shown in FIG. 6 are concerned, this embodiment of the invention functions in substantially the same manner as the embodiments described with relation to FIGS. 1–5.

In addition to the signal encoding elements, the desk calculator or other similar keyboard-actuated device shown in FIG. 6 may include a conventional register and calculating mechanism and printer shown in block diagram form at 51 which is interconnected with all the bellcranks 43*a*, etc. through a suitable interconnecting linkage shown at 52. The register and calculating mechanism and printer 51 may comprise any suitable known register and calculating mechanism, such as that described, for example, in U.S. Pat. No. 1,932,646, or any other known register and calculating mechanism. The register and calculating mechanism may be either mechanically or electromechanically operable and functions to perform addition, subtraction, or any other desired arithmetic operation with respect to selected ones of the alphanumeric characters punched into the keyboard. The register and calculating mechanism 51 will be connected and actuated by substantially all of bellcranks 43 associated with a particular key 42 as will be obvious to one skilled in the art. Thus, it will be appreciated that upon selective depression of any one of the plurality of keys 42*a*–42*d*, etc. in the keyboard, not only will its associated target member 47*a*–47*d*, etc. function to derive the desired coded, pulsed electric output signal in the above-described manner, but the apparatus will operate through the register and calculating mechanism and printer to produce simultaneously a solution to the particular mathematical operation which it is instructed to perform by an operator of the apparatus.

In addition to the register and calculating mechanism and printer 51, the bellcranks 43*a*, etc. further include lever arms 53*a*, etc. connected through a suitable interconnecting linkage 54*a* to an associated printing hammer 55*a* having a character formed thereon corresponding to the character of its associated key 42*a*–42*d*, etc. The respective printing hammers will be actuated to produce the permanent, hard copy record of data being fed into the machine simultaneously upon the depression of a respective key along with the registration of the date in the register and calculating mechanism and printer 51 and the derivation of the coded, pulsed, electric output signal. Thereafter, upon suitable instruction, the register and the calculating mechanism and printer 51 will operate on the input data to perform the instructed operation and selectively actuate selected ones of the plurality of hammers 55 to produce the desired, hard copy, permanent record of the solution for home office use. Simultaneously with the production of this local, home office copy of the transaction, the electric signal encoder arrangement will be supplying corresponding data to the central data processing computer either directly through an appropriate telephone coupler, or recording it on a magnetic recorder or the like for retention and subsequent transmittal to the central data processing computer.

Because the central data processing computer, when it is supplied with appropriate instructions, is capable of performing the instructed mathematical operations, it is not necessary that the signal encoders be activated to encode the solutions to the mathematical operations provided by the register and calculating mechanism and printer 51. For this reason, it may be desirable to provide an interconnection, shown at 56, between the register and calculating mechanism and printer 51 and the respective printing hammers 55*a* including a suitable clutching arrangement to allow the register and calculating mechanism and printer to produce the desired local office, hard copy, permanent record without transmitting the solution back through the encoding target members 47*a*. By this arrangement, the central data processing computer can arrive at its own solution and in a suitably designed, overall data processing system, supply its answer back to the local office for comparison to the locally derived, permanent record. This would provide a dual parity check on output data generated in the local office by reason of the dual transmission of each coded, pulsed, electric signal representative of the selected characters as well as a cross-check against the derived, resultant output solution. Alternatively, should it be desired, the coupling 56 from the register and calculating mechanism and printer 51 could be designed to appropriately actuate selected one of the target members 47*a*–47*d*, etc. through the respective bellcranks 43*a*, etc. to supply back to the central data processing computer the derived output solution simultaneously with the recording of the result on the hard copy produced by the desk calculator. However, such an alternative design would require that the register and calculation mechanism in printer 51 record its output results serially in order not to confuse the coded, pulsed electric output signals being derived from the common photoelectric converter comprising a part of the encoder.

Figure 7:
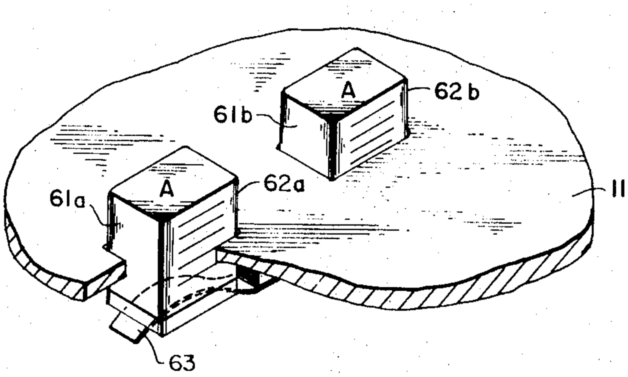
FIG. 7 is a partial, perspective view of still another form of low-cost, keyboard-actuated device having an electric signal encoding arrangement constructed in accordance with the invention.
Figure 8:
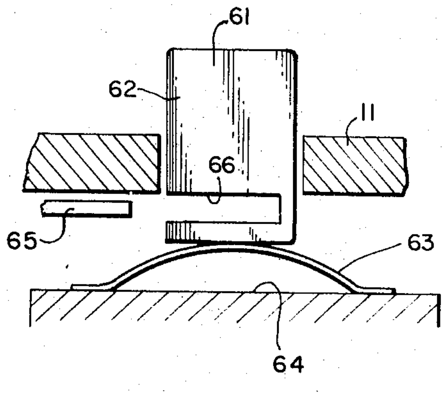
FIG. 8 is a side sectional view of one of the key-actuated members of the keyboard-actuated device shown in FIG. 7 illustrating its physical relation to a light-sensing and readout fiber-optic element.

FIGS. 7 & 8 illustrate still a different form of low-cost signal encoder constructed in accordance with the invention. In the embodiment of signal encoder shown in FIGS. 7 & 8, the respective key-actuated members 61*a*, 61*b*, etc. of a keyboard-actuated device are supported on a housing 11 in a desired array. The key-actuated members 61*a*, 61*b*, etc. in fact constitute body members having coded, alternate reflecting and nonreflecting patterns of stripes 62*a*, 62*b*, etc. formed on one side thereof. As best seen in FIG. 8, the body members are supported within housing 11 by means of a simple, clip-on leaf spring 63 secured between the bottom of the body members 61 and a suitable shelf or platform supporting surface 64 secured within housing 11. By this arrangement, the body members 61, which also form the keys to be depressed in the keyboard-actuated device, selectively may be translated downwardly and back up against the action of the leaf springs 63.

The body members 61 are positioned within housing 11 in such a manner that the surfaces having the coded array of alternate light-reflecting and nonreflecting stripes 62*a*, 62*b*, etc. are disposed opposite the end of a respective associated fiber-optic, light-transmitting and light-receiving element 65. Accordingly, upon the key body member 61 being depressed, the pattern of light-reflecting and nonreflecting stripes 62 will be scanned past the ends of the interrogating, light-transmitting and light-receiving fiber-optic elements in the detecting head 65.

In order to improve the signal to noise ratio of the output signals derived from a signal encoder such as that shown in FIGS. 7 & 8, the key body members 61 have cavities shown at 66 in FIG. 8 formed therein which are disposed opposite the ends of the fiber-optic light-transmitting and light-receiving detecting heads 65. The sides of the cavities 66 may be coated with a suitable, nonlight-reflecting surface so as to minimize or reduce the ambient light level within the housing 11. The cavities 66 are positioned so that they are disposed oppositely the detecting heads 65 with the key body members 61 in their normal, quiescent, undepressed condition.

The detecting heads of all the plurality of key body members 61*a*, 61*b*, etc. are assembled in a light optic arrangement such as shown in FIGS. 2 & 9 for supplying received light pulses representative of the characters formed on the key body members 61*a*, 61*b*, etc. back to a photoelectric converter for conversion to coded, pulsed electric signals in the previously described manner. Because the operation of the embodiment of the invention shown in FIGS. 7 & 8 is essentially the same as that described with relation to FIGS. 1–5, further detailed description of the manner of operation of FIGS. 7 & 8 is believed unnecessary.

From the foregoing description, it will be appreciated that the invention provides a multiposition electric signal encoder for devices such as desk calculators, and the like, for simultaneously producing an output coded electric signal representative of data being generated by the keyboard-actuated device along with other operations performed by the device. The electric signal encoder may be added to existing keyboard-actuated devices as an attachment or may be built into such devices at the time of original manufacture thereof as an integral part of the equipment. The multiposition signal encoder derives a uniquely coded output signal indicative of the fact of occurrence of each unique event in a sequence of such event (such as a series of control action in a process or machine) and also indicative of the order of occurrence of the events. Because of its design, the uniquely coded electric output signals may be changed to accommodate different events and/or their order of occurrence. Further, the multiposition signal encoder is relatively low cost and provides reliable electric signal encoding of the data being originally generated during operation of a key-actuated device, a testing routine or procedure, a materials-processing plant or equipment or process. As a consequence, much simpler, easier and reliable central office computer data processing is facilitated at comparatively low cost.

Having described several embodiments of a new and improved multiposition encoder constructed in accordance with the invention, it is believed obvious that other modifications and variations of the invention are possible in the light of the above teachings. It is, therefore, to be understood that changes may be made in the particular embodiments of the invention described which are within the full intended scope of the invention as defined by the appended claims.

What is claimed is:

1. A multiposition encoder comprising a plurality of individually coded target members with each coded target member being representative of a particular alphanumeric character and the like, the individually coded target members each comprising a unique arrangement of alternate light-reflecting and nonreflecting areas wherein the alternate areas modify light differently, respective sensing and readout fiber-optic light-transmitting and light-receiving elements for interrogating and reading out the coded information contained in the coded array of alternate light-reflecting and nonreflecting areas of the respective target members, respective key-actuated bidirectional translating means for translating the respective coded target members past their respective sensing and readout fiber-optic light-transmitting and light-receiving elements with both a forward and return movement whereby the output signal derived during movement of the coded target member in one direction can be compared to the output signal derived during movement in the opposite direction for parity check purposes, the respective key actuated bidirectional translating means each comprising an individual key-actuated body member having one surface formed with the coded array of alternate light-reflecting and nonreflecting areas and an additional surface directly engaging a return spring that allows for bidirectional translational movement of the coded target surface past the fiber-optic sensing and detecting elements in both a forward and return movement and a nonlight-reflecting cavity formed in the body member at a location such that it is normally positioned opposite the interrogating light-transmitting fiber-optic element with the key-actuated body member in its normal quiescent condition whereby ambient light level within the housing of the encoder is substantially reduced, and common electro-optical converting means responsive to the fiber-optic light receiving elements for converting the received light into serially coded pulsed electric signals.

2. A multiposition encoder according to claim 1 wherein all of the light-transmitting fiber-optic elements are supplied from a single common light source and all of the light-receiving fiber-optic elements are coupled to and excite a single common electro-optical converting element.

3. A multiposition encoder according to claim 1 wherein said return spring comprises a leaf spring interposed between the bottom surface of the key-actuated body member and a surface of the housing of the encoder for normally biasing the respective key-actuated body members into a quiescent normal position and allowing for translational movement of the coded target surface past the interrogating light-transmitting and light-receiving fiber-optic elements associated with the particular key-actuated body member.

4. A combination desk calculator and coded electric signal encoder comprising a housing supporting a plurality of keys forming a keyboard with each key being representative of a particular alphanumeric character and the like, register and calculating means supported within said housing and connected to and actuated by said keys for registering selected ones of the alphanumeric characters and performing desired arithmetic operations with respect to selected ones of the alphanumeric characters, printing means supported within said housing and connected to and actuated by said keys and said register and calculating means for providing a current permanent record of the transactions carried out on the calculating machine, a plurality of individually coded target members connected to and actuated by said plurality of keys with each coded target member being associated with a respective key and being representative of a particular alphanumeric character and the like, a plurality of interrogating sensing and readout detectors with each detector being positioned adjacent a respective one of the individually coded target members for sensing and reading out its respective coded characters, means for selectively individually translating the coded target members past their respective sensing and readout detectors upon their associated key being actuated, and common converting means coupled to all of the sensing and readout detectors for converting the outputs from the sensing and readout detectors into a serial-coded pulsed electric signal representative of the intelligence contained in the selectively actuated coded target members, the individually coded target members each comprising an array of alternate different light-reflecting areas wherein the alternate areas reflect light differently and the sensing and readout detectors comprise light-transmitting and light-receiving elements for illuminating and reading out the coded information contained in the coded array of alternate different light-reflecting areas of the respective target members, and the common converting means comprising a common photosensitive device for converting the intelligence contained in the modified received light into serially coded pulsed electric signals representative of the information punched into the calculator.

5. A combined calculator and signal encoder according to claim 1 wherein the light-transmitting and light-receiving elements are comprised by fiber-optic elements with one set of fiber-optic elements forming the light-transmitting elements and the remaining set of fiber optic elements forming the light-receiving elements.

6. A combined calculator and signal encoder according to claim 15 wherein all of the light-transmitting fiber-optic elements are supplied from a common single light source and all of the light-receiving fiber-optic elements are coupled to and excite a common single photosencitive cell.

7. A combined calculator and signal encoder according to claim 6 wherein the coded array of alternate different light reflecting areas is comprised by alternate stripes of light-reflecting surfaces and nonreflecting surfaces arrayed in a characteristic coded sequence representative of a particular character.

8. A combined calculator and signal encoder according to claim 7 wherein the means for translating the respective coded target members past their respective sensing and readout detectors provides both a forward and return movement whereby the output signal derived during movement of the coded target member in one direction can be compared to the output signal derived during movement in the opposite direction for parity check purposes, and further including key-actuated means for selectively translating the target members past their respective sensing and readout detectors with the key-actuated means identifying the particular character represented by the coded array of alternate light-reflecting and nonreflecting stripes on the target member.